United States Patent [19]

Dang et al.

[11] Patent Number: 5,312,895

[45] Date of Patent: May 17, 1994

[54] BENZOBISAZOLE COPOLYMER SYSTEM SOLUBLE IN APROTIC SOLVENTS

[75] Inventors: Thuy D. Dang, Dayton; Fred E. Arnold, Centerville, both of Ohio

[73] Assignee: The United States of America as represented by the Secretary of the Air Force, Washington, D.C.

[21] Appl. No.: 30,527

[22] Filed: Mar. 12, 1993

[51] Int. Cl.$^5$ .............................................. C08G 73/18
[52] U.S. Cl. ............................. 528/337; 525/435; 528/171; 528/172; 528/173; 528/183; 528/186; 528/342
[58] Field of Search ............... 528/337, 171, 172, 173, 528/342, 183, 186; 525/435

[56] References Cited

U.S. PATENT DOCUMENTS

| | | | |
|---|---|---|---|
| 4,785,115 | 11/1988 | Tsai et al. | 548/180 |
| 5,081,256 | 1/1992 | Arnold et al. | 548/159 |
| 5,140,092 | 8/1992 | Arnold et al. | 528/183 |
| 5,175,232 | 12/1992 | Arnold et al. | 528/168 |
| 5,216,114 | 6/1993 | Walles et al. | 528/337 |

Primary Examiner—Harold D. Anderson
Attorney, Agent, or Firm—Charles E. Bricker; Thomas L. Kundert

[57] ABSTRACT

Para-ordered aromatic heterocyclic polymers having repeating units of the formula:

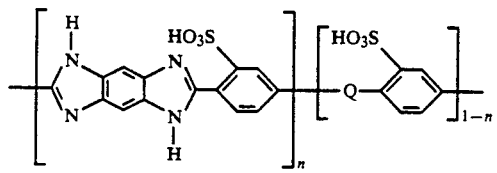

wherein n has a value of 0.05 to 1.00 and Q is a benzobisazole of the formula

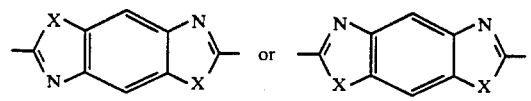

wherein X is —S— or —O—, are soluble in aprotic solvents.

6 Claims, No Drawings

BENZOBISAZOLE COPOLYMER SYSTEM SOLUBLE IN APROTIC SOLVENTS

RIGHTS OF THE GOVERNMENT

The invention described herein may be manufactured and used by or for the Government of the United States for all governmental purposes without the payment of any royalty.

BACKGROUND OF THE INVENTION

This invention relates to para ordered aromatic heterocyclic polymers which are soluble in aprotic solvents.

In general, the class of aromatic heterocyclic extended chain polymers and copolymers is well known for their outstanding thermal, physical and chemical properties. These polymers and copolymers generally exhibit excellent modulus and tenacity properties. Although these materials exhibit superior mechanical properties, they have the drawback that they generally can only be fabricated from strong corrosive acids such as polyphosphoric acid or methanesulfonic acid.

Accordingly, it is an object of this invention to provide para-ordered aromatic heterocyclic polymers and copolymers which are soluble in aprotic solvents.

Other objects and advantages of the invention will be apparent to those skilled in the art.

SUMMARY OF THE INVENTION

In accordance with the present invention, there are provided polymers having repeating units of the formula:

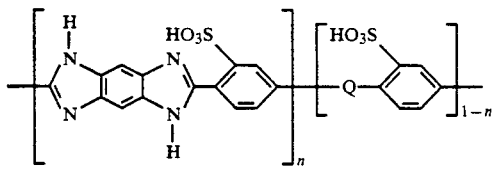

wherein n has a value of 0.05 to 1.00 and Q is a benzobisazole of the formula

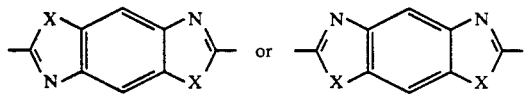

wherein X is —S— or —O—. These polymers are soluble in aprotic solvents such as dimethylsulfoxide (DMSO), dimethylformamide (DMF) and dimethylacetamide (DMAC).

DETAILED DESCRIPTION OF THE INVENTION

The polymer and copolymer compositions of this invention are prepared by the polycondensation of 2-sulfoterephthalic acid with 1,2,4,5-tetraaminobenzene hydrochloride and, optionally, 2,5-diamino-1,4-benzenedithiol dihydrochloride, 4,6-diamino-1,3-benzenedithiol dihydrochloride, 4,6-diaminoresorcinol dihydrochloride, 2,5-diaminohydroquinone dihydrochloride.

2-sulfoterephthalic acid can be prepared by the sulfonation of terephthalic acid with 100% sulfuric acid with mercury as a catalyst or by the oxidation of 2-sulfo-p-xylene with basic permanganate followed by acid treatment, as shown by the following reaction sequences:

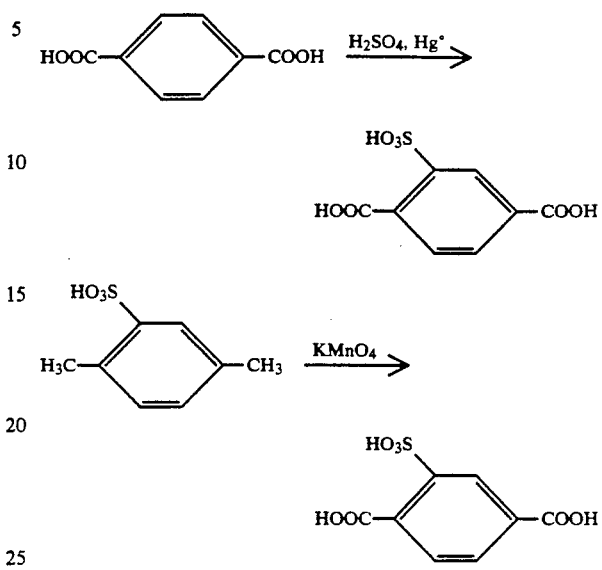

The polycondensation is carried out in polyphosphoric acid (PPA). In carrying out the process, stoichiometric amounts of the monomers are first heated at about 40°-80° C. in 77 percent PPA to effect dehydrochlorination of the amino hydrochloride monomer(s). This step is carried out under reduced nitrogen pressure to facilitate removal of the hydrogen chloride. After complete dehydrochlorination, the temperature is lowered to about 50° C. and $P_2O_6$ is added to provide about 82-84% PPA. The reaction mixture is then slowly heated under a nitrogen atmosphere to about 190° C., at atmospheric pressure. In general, the concentration of monomers in the acid ranges from about 0.5 to 15.0 weight percent. It is presently preferred to employ monomer concentrations above about 10 weight percent, in order to provide anisotropic reaction mixtures.

Alternatively, the amino hydrochloride monomer(s) may be mixed with PPA, then heated, under vacuum or an inert gas atmosphere to about 40°-80° C. over a period of 3 to 24 hours to dehydrochlorinate the amino hydrochloride monomer(s). At the end of this period, the dicarboxylic acid is added. An additional quantity of $P_2O_5$ and/or PPA may be added as required to provide a stirrable mixture and to increase the concentration of PPA to about 82-84%.

It is preferred to carry out the polymerization in stages, i.e., a step-wise heating schedule is employed. Such a schedule is preferred because immediately exposing the reaction mixture to relatively high polymerization temperature may cause decomposition of one or more monomers. The selection of a particular step-wise heating schedule is obvious to one of ordinary skill in the art. An exemplary heating schedule is 60° C. for 4 hours, 100° C. for 2 hours, 160° C. for 24 hours and 190° C. for 4 hours.

At the end of the reaction period, the polymer solution is in a very viscous or semi-solid state. After cooling, the product can be recovered by coagulation in water.

The molecular weight of these polymers is commonly indicated by the inherent viscosity of the polymer. The inherent viscosity is commonly determined at a concentration of 0.2 weight percent in methanesulfonic acid (MSA) at 30° C.

The polymers and copolymers prepared in accordance with the invention can be processed into fibers and sheets. For example, the polymers/copolymers can be dissolved in DMSO, cast into sheet form and the DMSO removed under reduced pressure at an elevated temperature.

The following examples illustrate the invention.

EXAMPLE I

Poly(1,7-dihydrobenzo(1,2-d:4,5-d')diimidazo-2,6-diyl(2-(2-sulfo)-p-phenylene))

4.4944 g (18.255 mmol) of 2-sulfoterephthalic acid, 5.184 g (18.255 mmol) of 1,2,4,5-tetraaminobenzene tetrahydrochloride and 13.48 g PPA (77% $P_2O_5$) were placed in a 150 ml resin flask equipped with a mechanical stirrer, nitrogen inlet/outlet and pressure regulator. The resulting mixture was dehydrochlorinated under reduced pressure (176 mm Hg) while heating slowly to 65° C. The reaction temperature was maintained at 65° C. for 16 hours, raised to 80° C. for 4 hours, then cooled to 60° C. 11.18 g $P_2O_5$ was added to the mixture, resulting in a polymer concentration of 18 percent. The mixture was heated under a nitrogen atmosphere at 60° C. for 2 hours, 100° C. for 16 hours and 170° C. for 16 hours. Stir opalescence began to occur at about 165° C. The mixture was finally heated to 190° C. for 16 hours. The polymer was precipitated in water, broken up with a blender, collected by suction filtration, washed with water and dried under reduced pressure (0.05 mm) at 100° C. The polymer exhibited an intrinsic viscosity of 14 dl/g in MSA at 30° C.

EXAMPLE II

Copoly(10%)
(1,7-dihydrobenzo(1,2-d:4,5-d')diimidazo-2,6-diyl
(90%)
(benzo(1,2-d:4,5-d')bisthiazole-2,6-diyl(2-(2-sulfo)-p-phenylene))

4.9239 g (20 mmol) of 2-sulfoterephthalic acid, 0.5680 g (2 mmol) of 1,2,4,5-tetraaminobenzene tetrahydrochloride, 4.4136 g (18 mmol) of 2,5-diamino-1,4-benzenedithiol dihydrochloride and 31.52 g PPA (77% $P_2O_5$) were placed in a 150 ml resin flask equipped with a mechanical stirrer, nitrogen inlet/outlet and pressure regulator. The resulting mixture was dehydrochlorinated under reduced pressure (176 mm Hg) while heating slowly to 65° C. The reaction temperature was maintained at 65° C. for 16 hours, raised to 80° C. for 4 hours, then cooled to 60° C. 17.35 g $P_2O_5$ was added to the mixture, resulting in a polymer concentration of 12 percent. The mixture was heated under a nitrogen atmosphere at 60° C. for 2 hours, 100° C. for 16 hours and 170° C. for 16 hours. The mixture was finally heated to 190° C. for 16 hours. The polymer was precipitated in water, broken up with a blender, collected by suction filtration, washed with water and dried under reduced pressure (0.05 mm) at 100° C. The polymer exhibited an intrinsic viscosity of 12 dl/g in MSA at 30° C.

EXAMPLE III

Copoly(25%)
(1,7-dihydrobenzo(1,2-d:4,5-d')diimidazo-2,6-diyl
(75%)
(benzo(1,2-d:4,5-d')bisthiazole-2,6-diyl(2-(2-sulfo)-p-phenylene))

4.9239 g (20 mmol) of 2-sulfoterephthalic acid, 1.4201 g (5 mmol) of 1,2,4,5-tetraaminobenzene tetrahydrochloride, 3.6786 g (15 mmol) of 2,5-diamino-1,4-benzenedithiol dihydrochloride and 30.39 g PPA (77% $P_2O_5$) were placed in a 150 ml resin flask equipped with a mechanical stirrer, nitrogen inlet/outlet and pressure regulator. The resulting mixture was dehydrochlorinated under reduced pressure (176 mm Hg) while heating slowly to 65° C. The reaction temperature was maintained at 65° C. for 16 hours, raised to 80° C. for 4 hours, then cooled to 60° C. 17.73 g $P_2O_5$ was added to the mixture, resulting in a polymer concentration of 12 percent. The mixture was heated under a nitrogen atmosphere at 60° C. for 2 hours, 100° C. for 16 hours and 170° C. for 16 hours. The mixture was finally heated to 190° C. for 16 hours. The polymer was precipitated in water, broken up with a blender, collected by suction filtration, washed with water and dried under reduced pressure (0.05 mm) at 100° C. The polymer exhibited an intrinsic viscosity of 13.7 dl/g in MSA at 30° C.

EXAMPLE IV

Copoly(50%)
(1,7-dihydrobenzo(1,2-d:4,5-d')diimidazo-2,6-diyl
(50%)
(benzo(1,2-d:4,5-d')bisthiazole-2,6-diyl(2-(2-sulfo)-p-phenylene))

3.4666 g (14.08 mmol) of 2-sulfoterephthalic acid, 1.9996 g (7.040 mmol) of 1,2,4,5-tetraaminobenzene tetrahydrochloride, 1.7263 g (7.040 mmol) of 2,5-diamino-1,4-benzenedithiol dihydrochloride and 20.72 g PPA (77% $P_2O_5$) were placed in a 150 ml resin flask equipped with a mechanical stirrer, nitrogen inlet/outlet and pressure regulator. The resulting mixture was dehydrochlorinated under reduced pressure (176 mm Hg) while heating slowly to 65° C. The reaction temperature was maintained at 65° C. for 16 hours, raised to 80° C. for 4 hours, then cooled to 60° C. 12.27 g $P_2O_5$ was added to the mixture, resulting in a polymer concentration of 12 percent. The mixture was heated under a nitrogen atmosphere at 60° C. for 2 hours, 100° C. for 16 hours and 170° C. for 16 hours. The mixture was finally heated to 190° C. for 16 hours. The polymer was precipitated in water, broken up with a blender, collected by suction filtration, washed with water and dried under reduced pressure (0.05 mm) at 100° C. The polymer exhibited an intrinsic viscosity of 6.0 dl/g in MSA at 30° C.

EXAMPLE V

Copoly(75%)
(1,7-dihydrobenzo(1,2-d:4,5-d')diimidazo-2,6-diyl
(25%)
(benzo(1,2-d:4,5-d')bisthiazole-2,6-diyl(2-(2-sulfo)-p-phenylene))

4.9239 g (20 mmol) of 2-sulfoterephthalic acid, 4.2603 g (25 mmol) of 1,2,4,5-tetraaminobenzene tetrahydrochloride, 1.2260 g (5 mmol) of 2,5-diamino-1,4-benzenedithiol dihydrochloride and 28.52 g PPA (77%

P$_2$O$_5$) were placed in a 150 ml resin flask equipped with a mechanical stirrer, nitrogen inlet/outlet and pressure regulator. The resulting mixture was dehydrochlorinated under reduced pressure (176 mm Hg) while heating slowly to 65° C. The reaction temperature was maintained at 65° C. for 16 hours, raised to 80° C. for 4 hours, then cooled to 60° C. 17.1 g P$_2$O$_5$ was added to the mixture, resulting in a polymer concentration of 12 percent. The mixture was heated under a nitrogen atmosphere at 60° C. for 2 hours, 100° C. for 16 hours and 170° C. for 16 hours. The mixture was finally heated to 190° C. for 16 hours. The polymer was precipitated in water, broken up with a blender, collected by suction filtration, washed with water and dried under reduced pressure (0.05 mm) at 100° C. The polymer exhibited an intrinsic viscosity of 8.5 dl/g in MSA at 30° C.

Various modifications may be made to the invention as described without departing from the spirit of the invention or the scope of the appended claims.

We claim:

1. A para-ordered aromatic heterocyclic polymer consisting essentially of repeating units of the formula:

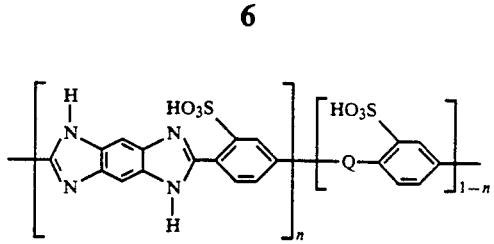

wherein n has a value of 0.05 to 1.00 and Q is a benzobisazole of the formula

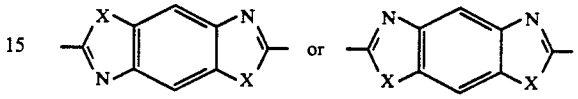

wherein X is —S— or —O—.

2. The polymer of claim 1 wherein n is 1.0.

3. The polymer of claim 1 wherein n is 0.1 and X is —S—.

4. The polymer of claim 1 wherein n is 0.25 and X is —S—.

5. The polymer of claim 1 wherein n is 0.5 and X is —S—.

6. The polymer of claim 1 wherein n is 0.75 and X is —S—.

* * * * *